Patented Jan. 24, 1950

2,495,282

UNITED STATES PATENT OFFICE 2,495,282

THERMOSETTING AND THERMOSET COMPOSITIONS COMPRISING MONOOLEFIN/CARBON MONOXIDE POLYMERS AND PROCESS FOR OBTAINING SAME

Paul Swithin Pinkney, Wilmington, Del., assignor to E. I. du Pont de Nemours & Company, Wilmington, Del., a corporation of Delaware No Drawing. Application November 5, 1946, Serial No. 707,995

4 Claims. (Cl. 260—67)

This invention relates to polymeric materials, and more particularly to new and improved thermosetting compositions and thermoset products.

This case is a continuation in part of my Patent No. 2,441,082.

This invention has as an object new and useful compositions of matter. Further objects are thermosetting compositions and thermoset products which are derived from polymeric materials and which are of particular utility for moldings, adhesives, coatings, etc. Still further objects reside in methods for obtaining these compositions. Other objects will appear hereinafter.

The above objects are accomplished by procedures described hereinafter which comprise forming a mixture of formaldehyde with the product obtained by heating ingredients comprising a monoolefin/carbon monoxide polymer, furfural, and a solution of a basic alkali or alkaline earth metal compound.

The heating of the above mentioned solution of ingredients is conducted at a temperature of at least 75° C. and up to the boiling point of the mixture for at least one-half hour. The furfural is present in amount at least equal to the weight of the polymer. It can be present in excess over that required to react with the polymer since the furfural can function as a reactant and as the reaction medium. If the furfural is not used in sufficient excess to serve as the reaction medium another organic solvent such as dioxane is added. The basic alkali is added as a water or alcohol solution and the alkali is usually present in amount of from 1% to 15% by weight of the polymer. Formaldehyde in amount of from 0.5 to 50%, by weight of the polymer, is admixed with the product obtained by reacting the polymer with furfural and alkali. The formaldehyde can be used in the form of paraformaldehyde, or an equivalent amount of some other formaldehyde-yielding substance.

In the method of practicing the invention which is preferred by reason of the better molding properties and the faster cure of the product obtained, the monoolefin/carbon monoxide polymer is first contacted with the basic alkali solution at temperatures of from room temperature, e. g., 25° C. up to the boiling point of the solution until the degree of unsaturation of the polymer has been increased by an amount corresponding to an oxo-oxygen loss of at least 5%. An iodine number of 25 corresponds approximately to an oxo-oxygen loss of 5% and the iodine number can therefore be used to express degree of unsaturation. The preparation of these basic alkali treated polymers is described in more detail in my Patent No. 2,457,271, and in Patent 2,457,279 issued to S. L. Scott.

The furfural is then added to the alkali treated polymer in the amount previously mentioned, and after heating to a temperature above 75° C. in the presence of basic alkali the reaction mixture is cooled to room temperature and acidified to separate the reaction product which is removed by filtration. After washing with water until free of acid the product is dried and then mixed with the formaldehyde by milling. The resulting thermosetting composition when molded under heat and pressure yields valuable thermoset articles. For this purpose the composition can be compounded with molding ingredients such as fillers, pigments, catalysts, e. g., maleic anhydride, and zinc stearate or other mold lubricants. The molded articles obtained are characterized by having excellent flexural strength.

The above described embodiment of the invention is illustrated in the first of the following examples in which the parts are by weight unless otherwise stated.

Example I

To a solution of 38 parts of an alkali-treated ethylene/carbon monoxide polymer, prepared as described subsequently, in 220 parts of dioxane and 38 parts of furfural at 90° C. is added 1.4 parts of potassium hydroxide as a 0.7 N solution in methanol. The resulting solution is kept at 90° C. for one hour and then poured into 400 parts of water and acidified with hydrochloric acid. The precipitate obtained is separated, washed with water, and dried. The product, which amounts to 54 parts, contains 37% combined furfural on the basis of hydrogen analysis. A mixture of 50 parts of this product, 5 parts of paraformaldehyde, 50 parts of 70 to 80-mesh white pine wood flour, one part of maleic acid, and 2 parts of zinc stearate is milled in a ball mill. The resulting molding composition is compression molded into standard test bars at 160° C. under a pressure of 3000 lb./sq. in. for 5 minutes. The moldings are hard and rigid and have a flexural strength of 12,900 lb./sq. in. and a yield temperature of 165° C. An increase in the maleic acid concentration to 2 parts increases the rate of cure of the composition containing paraformaldehyde to such an extent that well-molded bars are obtained in less than one minute at 160° C. When the same molding procedure is followed with the paraformaldehyde omitted the resulting moldings have a flexural strength of but 8000 lb./sq. in. and a yield temperature of 126° C.

The yield temperature measurements are carried out on 2½" x ½" x 1/16" molded bars. The bar is mounted horizontally by one end on a clamp, cantilever fashion, the supported end fitting ¼" into the vertical slot in the clamp so that the bar is supported ¼" from the end. At a point ¼" from the opposite end on the upper edge of the bar, a weight of 27.5 g. is placed so that it rests entirely on the test bar and is free to move up or down with the bar. The assembly (excepting the weight) is immersed in a bath of mineral oil which is uniformly heated at a steady rate of 2° C. per minute. The yield temperature is observed as that bath temperature at which the test bar permits the 27.5-g. weight to drop 0.06 inch. It is to be understood that all yield temperatures of molded specimens subsequently mentioned herein are determined by this method.

The preparation of the ethylene/carbon monoxide polymer used in the above experiment and its treatment with alkali is described below.

A silver-lined pressure reactor is flushed with nitrogen, charged with 100 parts of cyclohexane and 0.5 part of di(tert.butyl)peroxide, closed, evacuated, and pressured with a mixture of carbon monoxide and ethylene containing 44% carbon monoxide. The reaction mixture is heated to 135° C. and the pressure within the reactor is maintained at 350 to 450 atms. by periodically repressuring with the ethylene/carbon monoxide mixture. After reaction is complete, as evidenced by cessation of pressure drop, the reactor is permitted to cool to room temperature, and opened. The polymer is separated and dried. Analysis shows it to contain 65.63% carbon and 8.45% hydrogen.

Two hundred twenty-six parts of the ethylene/carbon monoxide polymer is dissolved in 1130 parts of dry dioxane and 120 parts of methanol. To the solution at 80° C. is added 7.4 parts of potassium hydroxide as a 0.7 N solution in methanol. The reaction mixture is kept at 75° C. to 80° C. for 1.5 hours, then poured into 2,700 parts of water, and acidified with hydrochloric acid. The precipitate of alkali treated ethylene/carbon monoxide polymer is separated by filtration, washed with water, and dried at 50° C. The yield of modified polymer is 180 parts. It contains 73.67% carbon and 7.78% hydrogen.

In a further method of carrying out the invention the polymer and alkali solution are blended, the furfural added in amount at least equal to the weight of the polymer, the mixture heated at a temperature of 75° C. or above and maintained at this temperature for at least one-half hour. The product after being isolated, washed and dried as before is then milled with formaldehyde and any desired molding ingredients. In still a further but less preferred variation the monoolefin/carbon monoxide polymer is blended with at least 30% of its weight of furfural in an inert solvent such as dioxane, the solution of the alkali added, and the blend heated as above for at least one-half hour. The formaldehyde, preferably in amount about equal to at least about 25% of the weight of the original polymer is then added without isolating the reaction product and the mixture heated further at a temperature of 75° C. for 30 minutes. The mixture is cooled to room temperature, acidified, the precipitate washed acid-free and dried. A molding composition is then prepared by compounding with molding ingredients of the kind previously mentioned. These methods are illustrated by the following examples.

*Example II*

To a solution of 30 parts of an ethylene/carbon monoxide polymer, prepared as in Example I, in 150 parts of dry dioxane at 80° C. is added one part of potassium hydroxide as a 0.7 N solution in methanol. The reaction mixture is heated for 1½ hours at 75° C., then 27 parts of furfural is added and the heating is continued at 75° C. for one hour. The reaction mixture is poured into 250 parts of water and acidified with hydrochloric acid. The precipitated product is separated, washed with water, and dried. It amounts to 36 parts and contains 72.95% carbon and 6.80% hydrogen. It is soluble in chloroform and dioxane. On the basis of the increase in weight of the product, it contains about 20% of combined furfural.

A molding composition is prepared by milling together in a ball mill 120 parts of the alkali- and furfural-treated polymer, 150 parts of 70 to 80-mesh white pine wood flour, 15 parts of paraformaldehyde, 6 parts of maleic acid, and 6 parts of zinc stearate. The composition is compression molded into standard test bars at 160° C. under a pressure of 3000 lb./sq. in. for less than 1 minute. Moldings are hard and rigid and have a flexural strength of 10,000 lbs./sq. in. and a yield temperature above 165° C.

*Example III*

To a solution of 30 parts of an ethylene/carbon monoxide polymer, prepared as described in Example I in 150 parts of dry dioxane at 80° C. is added one part of potassium hydroxide as a 0.7 N solution in methanol. The reaction mixture is heated for 1½ hours at 75° C., then 13.5 parts of furfural is added, and the heating is continued at 75° C. for 30 minutes. Then 21.5 parts of a 37% formaldehyde solution is added and the heating is continued for 30 minutes at 75° C. The reaction mixture is poured into 250 cc. of water and acidified with hydrochloric acid. The precipitated product is washed with water and dried. It amounts to 39 parts.

A molding composition is prepared by milling together in a ball mill 235 parts of the above product, 250 parts of wood flour, 5 parts of maleic acid, and 10 parts of zinc stearate. The composition is compression molded into standard test bars at 160° C. under a pressure of 3000 lb./sq. in. for less than 1 minute. The moldings are hard and rigid and have a flexural strength of 9000 lb./sq. in. and a yield temperature above 165° C.

*Example IV*

To a solution of 30 parts of an ethylene/carbon monoxide polymer, prepared as described in Example I in 200 parts of furfural at 80° C. is added 2 parts of potassium hydroxide as a 0.7 N solution in methanol. The temperature of the resulting solution is raised over a period of 1 hour to 150° C. while a mixture of methanol and furfural distills out. The clear, dark reaction mixture is taken up in 400 parts of dioxane and 600 parts of methanol. Then 1200 parts of water is added rapidly with good stirring to obtain a relatively stable dispersion. The product is precipitated by acidification, washed with water, and dried. It amounts to 63.5 parts and contains at least 53% combined furfural. It is soluble in acetone and methyl formate.

A molding composition is prepared by milling together in a ball mill 120 parts of the above product, 150 parts of wood flour, 15 parts of paraformaldehyde, 6 parts of maleic acid, and 6 parts of stearic acid. The composition is compression molded into standard test bars at 160° C. under a pressure of 300 lbs./sq. in. for less than one minute. The moldings are hard and rigid and have a flexural strength of 10,900 lbs./sq. in. and a yield above 165° C.

The alkali or alkaline earth metal compounds used in the treatment of the monoolefin/carbon monoxide polymers are those which are basic. Examples of suitable basic materials are sodium, potassium, and lithium hydroxides, and sodium, potassium, and lithium alcoholates, etc. In general, substances which yield the aforesaid hydroxides on hydrolysis will be understood to be equivalent to the hydroxides. From the standpoints of economy and effectiveness, the alkali metal hydroxides, especially sodium and potassium hydroxides, are preferred for the treatment of the monoolefin/carbon monoxide polymers.

Monoolefin/carbon monoxide polymers useful in the practice of this invention are preferably those which are soluble in hot dioxane and dioxolane and which contain from 20 to 50 mole percent of carbon monoxide. The remaining 80 to 50 mole percent can consist either of monoolefin alone or of monoolefin plus a minor amount of a third copolymerizable component. Those containing from 40 to 50 mole percent of carbon monoxide are preferable since they provide more rigid moldings than polymers containing less than 40 mole percent of carbon monoxide. Monoolefins polymerized with carbon monoxide to give polymers suitable for use in this invention include ethylene, propylene, the butylenes, and mixtures thereof. Of these, ethylene is preferred because of the superior rigidity of thermoset products obtained therefrom. The polymers may also contain minor proportions, for example, up to 20% or more, of one or more additional components such as vinyl acetate or diethyl maleate. The preparation of these polymers is described in the copending applications of M. M. Brubaker, S. N. 449,765, filed July 4, 1942, and S. N. 552,374, filed September 1, 1944, both of which are now abandoned, of which Serial No. 97,908, filed June 8, 1949, is a continuation-in-part.

The treatment of ethylene/carbon monoxide polymers with alkali and furfural may be carried out by any convenient method such as, for example, by mixing solutions of the basic compound, furfural, and polymer in suitable solvents, by adding a mixture of alkali or alkaline earth metal compound and furfural to a dispersion of the polymer, etc. Generally the alkali treatment is carried out in 1,3-dioxolane, or in dioxane containing enough water or methanol to prevent formation of products which are insoluble in the reaction medium. When the alkali treatment is carried out to such an extent that the products obtained are insoluble in the reaction medium, it is usually necessary to employ higher molding pressures to obtain satisfactory flow of molding compositions based on such products. Therefore the proportion of solvent, alkali, and polymer and the duration and temperature of the treatment are preferably adjusted to obtain products which remain soluble in the reaction mixture during the treatment. Such products, after acidification, are usually soluble also in chloroform to form solutions of lower viscosity than solutions of the original, untreated polymers.

In carrying out the present process the formaldehyde can be replaced by the known formaldehyde-yielding substances such as trioxymethylene, hexamethylenetetramine, paraformaldehyde, and 1,3,5-trioxane. The proportion of formaldehyde or its equivalent employed is sufficient to provide from 0.5% to 50%, based on the alkali-treated polymer, of free formaldehyde. The rate and extent of thermosetting are more satisfactory when from 10% to 35% of formaldehyde based on the polymer, is used. The blending of the ingredients can be accomplished in a ball mill, rubber mill, Banbury mixer, ribbon blender, or in any other suitable mixing device. The blending can also be accomplished through the use of a common solvent for the modified monoolefin/carbon monoxide polymer and formaldehyde, or in a solvent for one of the components only, or in a nonsolvent liquid medium. Another way for accomplishing the blending is by preparing an intermediate stage condensate by reacting in solution the alkali-treated ethylene/carbon monoxide polymer, or the furfural derivative of such polymer, with formaldehyde under alkaline conditions.

Although the use of acid catalysts for the thermosetting reaction is not essential, the rate of cure, water-resistance, etc., of the thermoset products are improved through the use of such catalysts, and their employment constitutes a preferred embodiment of this invention. Usually the amount of catalyst employed varies from 0.25 to 15% by weight of the modified monoolefin/carbon monoxide polymer. The preferred catalysts are polybasic carboxylic acids such as maleic, phthalic and citric acids. Acid reacting materials like ammonium chloride and urea nitrate are also effective catalysts.

The optimum temperatures at which the compositions of this invention cure to non-thermoplastic products is somewhat variable and depends upon such factors as the nature and proportion of the polymer, filler, catalyst, curing assistants, e. g., melamine or dicyandiamide, etc. It also depends upon the time employed. Although curing can be effected at temperatures as low as 40° C., it is generally preferred to employ temperatures of from 70° C. to the decomposition temperature of the ingredients of the composition. As a rule, however, the temperatures employed will range from about 130° C. to about 200° C.

In preparing moldings the pressure employed is that required to give fusion and flow under the conditions used. Generally pressures in excess of 100 lb./sq. in. are employed.

For best results it is desirable that the molding compound be dried before it is molded. To the molding compound may be added mold lubricants, such as zinc or aluminum stearates, etc.

To the thermosetting compositions of this invention may be added organic or mineral, inert or reinforcing fillers, e. g., wood flour, mica, silica, asbestos, macerated fabrics, hemp fibers, clay, carborundum, etc., in amounts which may be up to 90% or more of the final composition. The compositions may also contain dyes, toners, pigments, e. g., titanium dioxide, carbon black, etc., or other coloring agents. If desired, small amounts of other thermosetting resins, such as urea-formaldehyde or phenol-formaldehyde resins, can be added to the compositions.

Although the examples have illustrated the use of the compositions of this invention in the preparation of shaped articles by compression molding, it is to be understood that the compositions can also be employed in making shaped articles by jet or transfer molding techniques.

The compositions described herein, in addition to being valuable thermosetting bonding agents for plywood, are also useful as adhesives in other applications and as protective and/or decorative coatings for metal, wood, etc. They are also useful in finishing fabrics, as wire coatings, especially for electrical insulation, as impregnants for hardening woods, etc., as bonding agents for abrasives, etc.

As many apparently widely different embodiments of this invention may be made without departing from the spirit and scope thereof, it is to be understood that I do not limit myself to the specific embodiments thereof except as defined in the appended claims.

I claim:

1. A process for obtaining thermosetting compositions which comprises heating in solution at a temperature of from 75° C. to the boiling point of said solution ingredients comprising a monoolefin/carbon monoxide polymer, furfural in amount at least equal to the weight of said polymer, and a basic compound, in amount of from 1% to 15% by weight of said polymer, continuing said heating for at least one-half hour, and mixing the product thus obtained formaldehyde in amount of from 10% to 50% by weight of said polymer, said basic compound being selected from the group consisting of alkali and alkaline earth metal compounds, said polymer consisting of from 20 to 50 mol per cent carbon monoxide and from 80 to 50 mol per cent of polymerizable material consisting predominately of a monoolefin containing from 2 to 4 carbon atoms.

2. A process for obtaining thermosetting compositions which comprises heating in solution at a temperature of from 75° C. to the boiling point of said solution ingredients comprising furfural and monoolefin/carbon monoxide polymer which has been reacted with a solution of a basic compound at a temperature of from 25° C. to the boiling point of said solution until the degree of unsaturation of the polymer has been increased by an amount corresponding to an oxo-oxygen loss of at least 5%, the furfural being present in amount at least equal to the weight of said polymer, continuing said heating of the furfural and alkali reacted polymer for at least one-half hour, and mixing the product thus obtained with formaldehyde in amount of from 10% to 50% by weight of said polymer, said polymer consisting of from 20 to 50 mol per cent carbon monoxide and from 80 to 50 mol per cent of polymerizable material consisting predominately of a monoolefin containing from 2 to 4 carbon atoms.

3. A thermosetting composition which comprises a mixture of formaldehyde and the product obtained by heating from 75° C. to the boiling point a solution containing a monoolefin/carbon monoxide polymer, a basic compound in amount of from 1% to 15% by weight of said polymer, and furfural in amount at least equal to the weight of said polymer, said composition containing said formaldehyde in amount of from 10% to 50% by weight of said polymer, said basic compound being selected from the group consisting of alkali and alkaline earth metal compounds, said polymer consisting of from 20 to 50 mol per cent carbon monoxide and from 80 to 50 mol per cent of polymerizable material consisting of a monoolefin containing from 2 to 4 carbon atoms.

4. The thermoset product obtained by heating the composition defined in claim 3 at a temperature of from 40° C. to 200° C.

PAUL SWITHIN PINKNEY.

REFERENCES CITED

The following references are of record in the file of this patent:

UNITED STATES PATENTS

| Number | Name | Date |
|---|---|---|
| 1,737,121 | Novotny | Nov. 26, 1929 |
| 2,351,120 | Hanford | June 13, 1944 |